United States Patent
Tsukagoshi

(10) Patent No.: US 11,134,254 B2
(45) Date of Patent: Sep. 28, 2021

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/305,009

(22) PCT Filed: Apr. 20, 2015

(86) PCT No.: PCT/JP2015/061937
§ 371 (c)(1),
(2) Date: Oct. 18, 2016

(87) PCT Pub. No.: WO2015/163267
PCT Pub. Date: Oct. 29, 2015

(65) Prior Publication Data
US 2017/0188034 A1    Jun. 29, 2017

(30) Foreign Application Priority Data

Apr. 25, 2014    (JP) .............................. JP2014-092083

(51) Int. Cl.
*H04N 19/31* (2014.01)
*H04N 19/70* (2014.01)
(Continued)

(52) U.S. Cl.
CPC .......... *H04N 19/31* (2014.11); *H04N 19/172* (2014.11); *H04N 19/44* (2014.11); *H04N 19/70* (2014.11);
(Continued)

(58) Field of Classification Search
CPC ...... H04N 19/31; H04N 19/172; H04N 19/44; H04N 19/70; H04N 21/438
See application file for complete search history.

(56) References Cited

U.S. PATENT DOCUMENTS

| 2007/0220553 A1* | 9/2007 | Branam ........... H04N 21/26283 725/46 |
| 2011/0080945 A1* | 4/2011 | Thang .................. H04N 19/132 375/240.02 |

(Continued)

FOREIGN PATENT DOCUMENTS

| JP | 2012138940 A | 7/2012 |
| WO | WO 2013/005406 A1 | 1/2013 |

(Continued)

OTHER PUBLICATIONS

J. Chen, et al., "High efficiency video coding (HEVC) scalable extension Draft 6," Joint Collaborative Team on Video Coding (JCT-VC) of ITU-T SG 16 WP 3 and ISO/IEC JTC 1/SC 29/WG 11, 17th Meeting, Mar. 27-Apr. 4, 2014, 21 pages.

(Continued)

*Primary Examiner* — Joseph Suh
(74) *Attorney, Agent, or Firm* — Oblon, McClelland, Maier & Neustadt, L.L.P.

(57) ABSTRACT

A receiving side is enabled to perform excellent decode processing according to decoding capability.

An image encoding unit classifies image data of each picture consisting moving picture data into a plurality of layers, encodes the classified image data of the picture in each of the plurality of layers, and generates video data having the encoded image data of the picture in each of the plurality of layers A data transmission unit transmits the video data. An information transmission unit transmits a level designation (Continued)

value of a bit stream and information on a layer range in each of a plurality of layer ranges having a different maximum layer.

15 Claims, 18 Drawing Sheets

(51) Int. Cl.

| | | |
|---|---|---|
| *H04N 21/434* | (2011.01) | |
| *H04N 21/84* | (2011.01) | |
| *H04N 21/4402* | (2011.01) | |
| *H04N 21/2362* | (2011.01) | |
| *H04N 21/438* | (2011.01) | |
| *H04N 19/172* | (2014.01) | |
| *H04N 19/44* | (2014.01) | |
| *H04N 19/187* | (2014.01) | |
| *H04N 19/157* | (2014.01) | |
| *H04N 19/127* | (2014.01) | |
| *H04N 19/156* | (2014.01) | |

(52) U.S. Cl.
CPC ....... *H04N 21/2362* (2013.01); *H04N 21/438* (2013.01); *H04N 21/4345* (2013.01); *H04N 21/440281* (2013.01); *H04N 21/84* (2013.01); *H04N 19/127* (2014.11); *H04N 19/156* (2014.11); *H04N 19/157* (2014.11); *H04N 19/187* (2014.11)

(56) References Cited

U.S. PATENT DOCUMENTS

| | | | | |
|---|---|---|---|---|
| 2012/0183059 A1* | 7/2012 | Nishi | H04N 19/50 | 375/240.12 |
| 2014/0125765 A1* | 5/2014 | Mochinaga | H04N 13/178 | 348/43 |
| 2014/0294063 A1* | 10/2014 | Chen | H04N 19/503 | 375/240.02 |
| 2014/0301451 A1* | 10/2014 | Deshpande | H04N 19/30 | 375/240.12 |
| 2014/0301453 A1* | 10/2014 | Deshpande | H04N 19/159 | 375/240.12 |
| 2014/0354640 A1* | 12/2014 | Nystad | G06T 15/40 | 345/421 |
| 2015/0023432 A1* | 1/2015 | Choi | H04N 19/30 | 375/240.26 |
| 2015/0124884 A1* | 5/2015 | Yuzawa | H04N 19/70 | 375/240.16 |
| 2015/0181459 A1* | 6/2015 | Zhu | H04L 65/80 | 370/236 |
| 2015/0256856 A1* | 9/2015 | Tsukuba | H04N 19/30 | 375/240.25 |
| 2015/0288976 A1* | 10/2015 | Hendry | H04N 19/30 | 375/240.12 |
| 2016/0065980 A1* | 3/2016 | Choi | H04N 19/172 | 375/240.25 |
| 2016/0073127 A1* | 3/2016 | Park | H04N 19/52 | 375/240.16 |
| 2016/0134879 A1* | 5/2016 | Choi | H04N 19/30 | 375/240.25 |
| 2016/0286239 A1* | 9/2016 | Sato | H04N 19/44 | |

FOREIGN PATENT DOCUMENTS

| | | | |
|---|---|---|---|
| WO | WO-2013150764 A | 10/2013 | |
| WO | WO-2014002914 A | 1/2014 | |
| WO | 2014/050597 A1 | 4/2014 | |
| WO | WO-2014050597 A | 4/2014 | |

OTHER PUBLICATIONS

"Service Information for Digital Broadcasting System." ARIB STD-B10, 5.4 Edition, Jul. 31, 2014, 4 pages.
V. K. M. Vadakital, et al., "Text of ISO/IEC 14996-15:2013 PDAM 1 Carriage of Layered HEVC," IS0/IEC JTC1/SC29/WG11, MPEG/ N14727, Jul. 2014, 5 pages.
G. J. Sullivan, et al., "Overview of the High Efficiency Video Coding (HEVC) Standard," IEEE Transactions on Circuits and Systems for Video Technology, vol. 22, No. 12, Dec. 2012, pp. 1649-1668.
International Search Report dated Jun. 9, 2015 in PCT/JP2015/ 061937 filed Apr. 20, 2015.
Extended European Search Report dated Aug. 11, 2017 in Patent Application 15783156.1.
Ying Chen, et al. "Carriage of HEVC multi-layer extension streams over MPEG-2 Systems" Qualcomm Incorporation, 2014, p. 7.
Munsi Hague, et al. "On HEVC descriptors for Temporal sub-streams with a single PID in a MPEG-2 Transport Stream" Sony Electronics, Inc. and Sony Corp., 2012, p. 7.
Karsten Grüneberg, et al. "WD of ISO/IEC 13818-1:2013 AMD 7 Carriage of Layered HEVC" Systems, 2014, p. 27.
European Office Action dated Feb. 13, 2019 in European Patent Application No. 15783156.1, 7 pages.
Hague M et al: "On HEVC descriptors for Temporal sub-streams with multiple PIDs in a MPEG-2 Transport Stream", 101. MPEG Meeting; Jul. 16-20, 2012; Stockholm; (Motion Picture Expert Group or ISO/IEC JTC1/SC29/WG11), No. m26187, Jul. 16, 2012 (Jul. 16, 2012), XP030054520, 6 pages.
Schierl T et al: "HEVC/MPEG-H part 2 or ITU-T Rec. H.265 & #61623", 3GPP Draft; S4-121322 System Layer Integration of HEVC, $3^{RD}$ Generation Partnership Project (3GPP), Mobile Competence Centre; 650, Route Des Lucioles; F-06921 Sophia-Antipolis Cedex; France, Oct. 31, 2012 (Oct. 31, 2012), XP050687116, 13 pages.
Japanese Office Action dated Jun. 25, 2019 in Japanese Application No. 2016-514910; 3 pages.
Recommendation ITU-T H. 222.0 (2012)—Amendment 3, ITU-T, 2014, URL, https://www.itu.int/rec/T-REC-H..222.0-201401-S!Amd3/ en, 22 pages.
Chinese Office Action dated Dec. 21, 2018 in Chinese Patent Application No. 2015800204406 17 pages.
Munsi Haque et al., "On HEVC descriptors for Temporal sub-streams with a single PID in a MPEG-2 Transport Stream" Sony Electronics, Inc. and Sony Corp., Jul. 2012. 7 Pages.
Ying Chen et al., Carriage of HEVC multi-layer extension streams over MPEG-2 Systems, Qualcomm Incorporation, Jan. 2014, 7 pages.
"WD of ISO/IEC 13818-1.2013 AMD 7 Carriage of Layered HEVC", 107. MPEG Meeting; Jan. 13-17, 2014, San Jose; (Motion Picture Expert Group or ISO/IEC JTC1/SC29/WG11),, (Feb. 13, 2014), No. N14118, XP030020856.
Haque M et al, "On HEVC descriptors for Temporal sub-streams with a single PID in a MPEG-2 Transport Stream", 101. MPEG Meeting; Jul. 16-20, 2012; Stockholm; (Motion Picture Expert Group or ISO/IEC JTC1/SC29/WG11),, (Jul. 11, 2012), No. m26186, XP030054519.
Chen Y et al, "Carriage of HEVC multi-layer extension streams over MPEG-2 Systems", 107. MPEG Meeting, Jan. 13-17, 2014; San Jose; (Motion Picture Expert Group or ISO/IEC JTC1/SC29/ WG11),, (Jan. 8, 2014), No. m32295, XP030060747.
ITU-T Telecommunication Standardization Sector of ITU, H.222.0 Amendment 3, Series H: Audiovisual and Multimedia Systems, Infrastructure of audiovisual services—Transmission multiplexing and synchronization, Information technology—Generic coding of moving pictures and associated audio information: Systems, "Amendment 3: Transport of HEVC video over MPEG-2 systems", https:// www.itu.int/rec/T-REC-H.222.0-201401-S!Amd3/en, Jan. 2014 (22 pages).

* cited by examiner

```
nal_unit_header( ) {                    Descriptor
    forbidden_zero_bit                  f(1)
    nal_unit_type                       u(6)
    nuh_layer_id                        u(6)
    nuh_temporal_id_plus1               u(3)
}
```

(b)

Semantics

Forbidden_zero_bit      (1bit)
　0 IS NECESSARY.
Nal_unit_type           (6bits)
　VALUE IS DETERMINED FOR EACH OF FOLLOWING NAL units.

| AUD | VPS | SPS | PPS | PSEI | SLICE | SSEI | EOS |

Nuh_layer_id            (6bits)
　0 IS ASSUMED.
Nuh_temporal_id_plus1   (3bits)
　temporal_id IS INDICATED. VALUE OBTAINED BY ADDING 1 (1 TO 7) IS TAKEN.
　VALUE OF temporal_id ITSELF IS 0 TO 6.

FIG. 4

VALUE OF level_idc

| Level IDc | | | |
|---|---|---|---|
| 4.1 (1080/50p) ==> | 123 | 0x7b -> "b" | ls4b_sublayer_Level_idc |
| 4.2 (1080/100p) ==> | 126 | 0x7e | level_idc |
| 5.1 (2160/50p) ==> | 153 | 0x99 -> "9" | ls4b_sublayer_Level_idc |
| 5.2 (2160/100p) ==> | 156 | 0x9c | level_idc |
| 6.1 (4320/50p) ==> | 183 | 0xb7 -> "7" | ls4b_sublayer_Level_idc |
| 6.2 (4320/100p) ==> | 186 | 0xba | level_idc |

FIG. 6

Syntax WHEN ELEMENTS ARE ADDED TO EXISTING DESCRIPTOR

| Syntax | No. of Bits | Format |
|---|---|---|
| hevc descriptor ( ) { | | |
| descriptor_tag | 8 | bslbf |
| descriptor_length | 8 | bslbf |
| ... | | |
| profile_idc | | |
| profile_compatibility_indication | | |
| level_idc | 8 | uimsbf |
| temporal_layer_subset_flag | 1 | bslbf |
| hevc_still_present_flag | 1 | uimsbf |
| ... | | |
| reserved | 1 | '1' |
| ls4b_sublayer_level_idc | 4 | uimsbf |
| if(temporal_layer_subset_flag ){ | | |
| reserved | 2 | bslbf |
| temporal_id_sublayer_min | 3 | uimsbf |
| temporal_id_min | 3 | uimsbf |
| reserved | 2 | bslbf |
| temporal_id_sublayer_max | 3 | uimsbf |
| temporal_id_max | 3 | uimsbf |
| } | | |
| } | | |

FIG. 7

New descriptor 'layer_signaling descriptor' Syntax

| Syntax | No. of Bits | Format |
|---|---|---|
| Layer_signaling_descriptor ( ) { | | |
| descriptor_tag | 8 | bslbf |
| descriptor_length | 8 | bslbf |
| overall_profile_idc | 8 | uimsbf |
| highest_level_idc | 8 | uimsbf |
| number_of_profile_layers | 8 | uimsbf |
| number_of_level_layers | 8 | uimsbf |
| for ( I = 0 ; I < number_of_profile_layers ; i++ ){ | | |
| layer_profile_idc[i] | 8 | uimsbf |
| for ( j = 0 ; j < number_of_level_layers ; j++ ){ | | |
| layer_level_idc[i][j] | 8 | uimsbf |
| temporal_id_layer_min[i][j] | 8 | uimsbf |
| temporal_id_layer_max[i][j] | 8 | uimsbf |
| } | | |
| } | | |
| } | | |

FIG. 8

Semantics

| | |
|---|---|
| overall_profile_idc | profile OF MAXIMUM RANGE RELATED TO SCALABLE ENCODE TOOLS IS INDICATED. |
| highest_level_idc | MAXIMUM LEVEL OF SCALABLE RANGE IS INDICATED. |
| number_of_profile_layers | NUMBER OF profile layers HAVING SCALABLE FUNCTION IS INDICATED. |
| number_of_level_layers | NUMBER OF level layers IS INDICATED. |
| layer_profile_idc[i] | profile OF EACH profile layer IS INDICATED. |
| layer_level_idc[i][j] | level OF EACH level layer IS INDICATED. |
| temporal_id_layer_min[i][j] | VALUE OF MINIMUM temporal_id IN EACH level layer IS INDICATED. |
| temporal_id_layer_max[i][j] | VALUE OF MAXIMUM temporal_id IN EACH level layer IS INDICATED. |

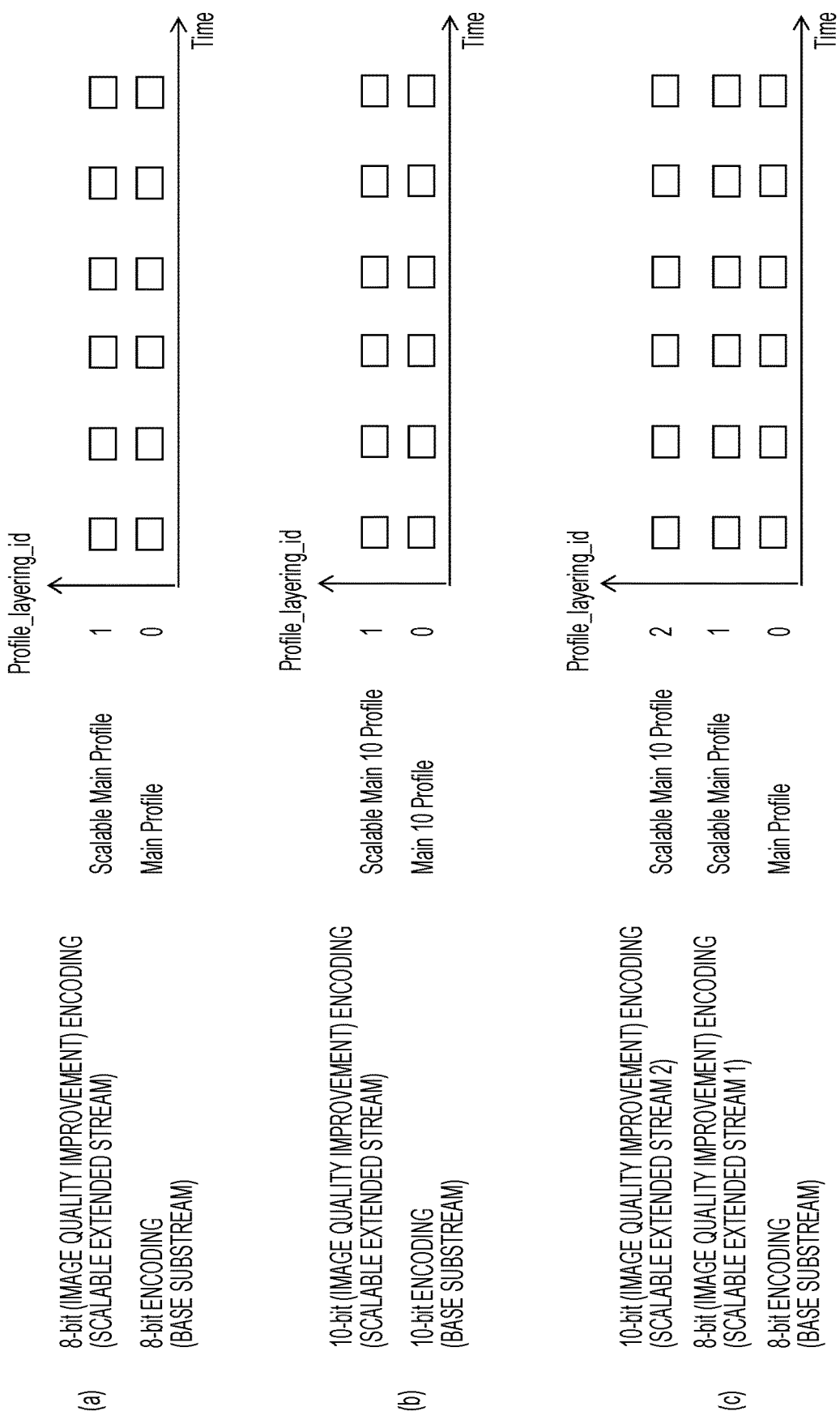

FIG. 18

```
<MPD
   xmlns:xsi="http://www.w3.org/2001/XMLSchema-instance"
   xmlns="urn:mpeg:DASH:schema:MPD:2011"
   xsi:schemaLocation="urn:mpeg:DASH:schema:MPD:2011 DASH-MPD.xsd"
   type="static"
   mediaPresentationDuration="PT3256S"
   minBufferTime="PT1.2S"
   profiles="urn:mpeg:dash:profile:isoff-on-demand:2011">
   <BaseURL>http://cdn1.example.com/</BaseURL>    /*url INDICATING video CONTAINER */
<Period>
     <AdaptationSet>
                 overall_profile_idc
                 highest_level_idc
                 number_of_profile_layers
                 number_of_level_layers
                 for ( l = 0 ; l < number_of_layers ; i++){
                             layer_profile_idc[i]
                                 for ( j = 0 ; j < number_of_sublayers ; j++){
                                             layer_level_idc[i][j]
                                             temporal_id_layer_min[i][j]
                                             temporal_id_layer_max[i][j]
                                 }
                 }
       minBandwidth="512000"
       maxBandwidth="1024000"
       width="3840"
       height="2160"
       frameRate="60"
       lang="en">
      <!-- Independent Representation -->
        <Representation
             mimeType="video/mp4"
             codecs="avc1.4D401E,mp4a.0x40"
             id="tag5"
             bandwidth="512000">
           <BaseURL>video-512k.mp4</BaseURL>
           <SegmentBase indexRange="0-4332"/>
        </Representation>
```

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method, and relates to a transmission apparatus or the like which hierarchically encodes and transmits image data of each picture consisting moving picture data.

BACKGROUND ART

When a service of a compressed moving picture is provided by broadcasting, the internet, or the like, the upper limit of a reproducible frame frequency is defined by the decoding capability of receivers. Thus, service sides need to restrict services having a low frame frequency and simultaneously provide services having a plurality of high and low frame frequencies taking the reproducible capability of widespread receivers into consideration.

The cost of a receiver is too high to deal with a service having a high frame frequency, which is an obstruction factor of spreading. When service sides start a service having a high frame frequency although inexpensive receivers dedicated for services having a low frame frequency have been widespread, the service having a high frame frequency can never be viewed without a new receiver, which is an obstruction factor of spreading of the service.

For example, in High Efficiency Video Coding (HEVC), a time direction scalability by hierarchically encoding image data of each picture consisting moving picture data has been presented (Non Patent Document 1). A receiving side can identify, based on a temporal ID (temporal_id) inserted in a header of a network abstraction layer (NAL) unit, the layer of each picture, and can selectively perform decoding to a layer corresponding to decoding capability.

CITATION LIST

Non Patent Document

Non Patent Document 1: Gary J. Sullivan, Jens-Rainer Ohm, Woo-Jin Han, Thomas Wiegand, "Overview of the High Efficiency Video Coding (HEVC) Standard" IEEE TRANSACTIONS ON CIRCUITS AND SYSTEMS FOR VIDEO TECHNOLOGY, VOL. 22, NO. 12, pp. 1649-1668, DECEMBER 2012

SUMMARY OF THE INVENTION

Problems to be Solved by the Invention

A purpose of the present technology is to enable a receiving side to perform excellent decode processing according to decoding capability.

Solutions to Problems

A concept of the present technology is a transmission apparatus including an image encoding unit which classifies image data of each picture consisting moving picture data into a plurality of layers, encodes the classified image data of the picture in each of the plurality of layers, and generates a video stream having the encoded image data of the picture in each of the plurality of layers, a data transmission unit which transmits the video data, and an information transmission unit which transmits a level designation value of a bit stream and information on a layer range in each of a plurality of layer ranges having a different maximum layer.

In the present technology, image data, of each picture consisting moving picture data is encoded and video data is generated by the image encoding unit. In this case, the image data of each picture consisting the moving picture data is classified into a plurality of layers and encoded, and a data stream having the image data of the picture in each of the plurality of layers is generated. The video data is transmitted by the transmission unit.

A level designation value of a bit stream and information on a layer range in each of a plurality of layer ranges having a different maximum, layer are transmitted by the information transmission unit. For example, the information transmission unit may insert the information in a layer of a container containing the video data and transmit the information. In this case, for example, the container is an MPEG2-TS, and the information transmission unit may insert the information under a program map table, and transmit the information. Furthermore, for example, the information transmission unit may insert the information in a metafile having meta-information related to the video data, and transmit the information. In this case, for example, the metafile may be an MPD file.

As described above, in the present technology, a level designation value of a bit stream and information on a layer range in each of a plurality of layer ranges having a different maximum layer are transmitted. Thus, it is possible for a receiving side to easily decode encoded image data of a picture in a layer range according to decoding performance.

Note that, in the present technology, the information transmission unit may transmit, together with information on a profile, the level designation value of the bit stream, and the information on the layer range in each of the plurality of layer ranges having a different maximum layer. In this case, it is possible for the receiving side to confirm the layer range according to the decoding performance on the basis of the information on the profile in addition to the level designation value of the bit stream.

Furthermore, another concept of the present technology is a reception apparatus including a data reception unit which receives video data, having encoded image data of a picture in each of a plurality of layers obtained by classifying image data, of each picture consisting moving picture data into the plurality of layers and encoding the image data, an information reception unit which receives a level designation value of a bit stream and information on a layer range in each of a plurality of layer ranges having a different maximum layer, and a processing unit which extracts, from the video data, the image data of the picture in a layer lower than a predetermined layer and decodes the image data on the basis of the information.

In the present technology, video data is received by the reception unit. The video data has encoded image data of a picture in each of a plurality of layers obtained by classifying image data of each picture consisting moving picture data into the plurality of layers and encoding the image data.

A level designation value of a bit stream and information on a layer range in each of a plurality of layer ranges having a different maximum layer are received by the information reception unit. For example, the information reception unit may acquire the information from a layer of a container containing the video data. Furthermore, for example, the information reception unit may acquire the information from a metafile having meta-information related to the video data. The image data of the picture in a layer lower than a predetermined layer is extracted from the video data and decoded on the basis of the information by the processing unit.

As described above, in the present technology, a level designation value of a bit stream and information on a layer range in each of a plurality of layer ranges having a different maximum layer are received, and image data of the picture in a layer lower than a predetermined layer is extracted from the video data and decoded on the basis of the information. Thus, it is possible to easily decode encoded image data of a picture in a layer range according to decoding performance.

Effects of the Invention

According to the present technology, it is possible for a receiving side to perform excellent decode processing according to decoding capability. Note that, effects are not necessarily limited to the effects described here and may be any one of the effects described, in the present disclosure.

BRIEF DESCRIPTION OF DRAWINGS

FIGS. 2(a) and 2(b) are structure examples of a NAL unit header and a diagram illustrating semantics of a main parameter in the structure example.

FIG. 4 is a diagram illustrating "level_idc" and an example of the value.

FIG. 6 is a diagram illustrating a structure example of an element-added HEVC descriptor.

FIG. 7 is a diagram illustrating a structure example of a layer/signaling/descriptor.

FIG. 8 is a diagram illustrating semantics of main information in the structure example of the layer/signaling/descriptor.

FIGS. 9(a) to 9(c) are diagrams explaining a configuration example of a profile layer.

FIG. 18 is a diagram illustrating an implementation of an MPD file.

MODE FOR CARRYING GUT THE INVENTION

Hereinafter, mode for carrying out the invention (hereinafter, referred to as an "embodiment") is described. Note that, the description is made in the following order:
1. Embodiment
2. Modified example 1. Embodiment

Figure 1:
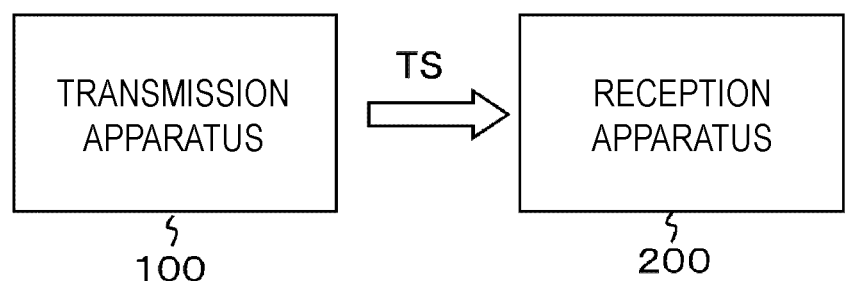
FIG. 1 is a block diagram, illustrating a configuration example of a transceiver system of an embodiment.

[Transceiver System]
FIG. 1 illustrates a configuration example of a transceiver system 10 of an embodiment. The transceiver system 10 includes a transmission apparatus 100 and a reception apparatus 200.

The transmission apparatus 100 transmits a transport stream TS as a container on a broadcast wave. The transport stream TS contains video data having encoded image data of a picture in each of a plurality of layers obtained by classifying image data of the picture consisting moving picture data into the plurality of layers and encoding the image data. In this case, by, for example, performing encoding such as H.264/AVC or H.265/HEVC, the image data is encoded so that a referred picture belongs to the own layer and/or a layer lower than the own layer.

Layer identification information is added to the encoded image data of the picture of each of the layers in order to identify the layer to which each picture belongs. In this embodiment, the layer identification information ("nuh_temporal_id_plus1"indicating temporal_id) is arranged in a header part of a NAL unit (nal_unit) of each picture. By adding the layer identification information in this manner, it is possible for a receiving side to selectively extract encoded image data in a layer lower than a predetermined layer and perform decode processing.

FIG. 2(a) illustrates a structure example (Syntax) of a NAL unit header, and FIG. 2(b) illustrates semantics of a main parameter in the structure example. A 1-bit field of "Forbidden_zero_bit" is necessarily 0. A 6-bit field of "Nal_unit_type" indicates a NAL unit type. A 6-bit field of "Nuh_layer_id" assumes 0. A 3-bit field of "Nuh_temporal_id_plus 1" indicates temporal_id, and takes a value obtained by adding 1 (1 to 7).

The transport stream TS contains a single video stream. Furthermore, a level designation value of a bit stream and information on a layer range in each of a plurality of layer ranges having a different maximum layer are inserted in the transport stream TS. The information is inserted, for example, under a program map table (PMT).

Figure 3:
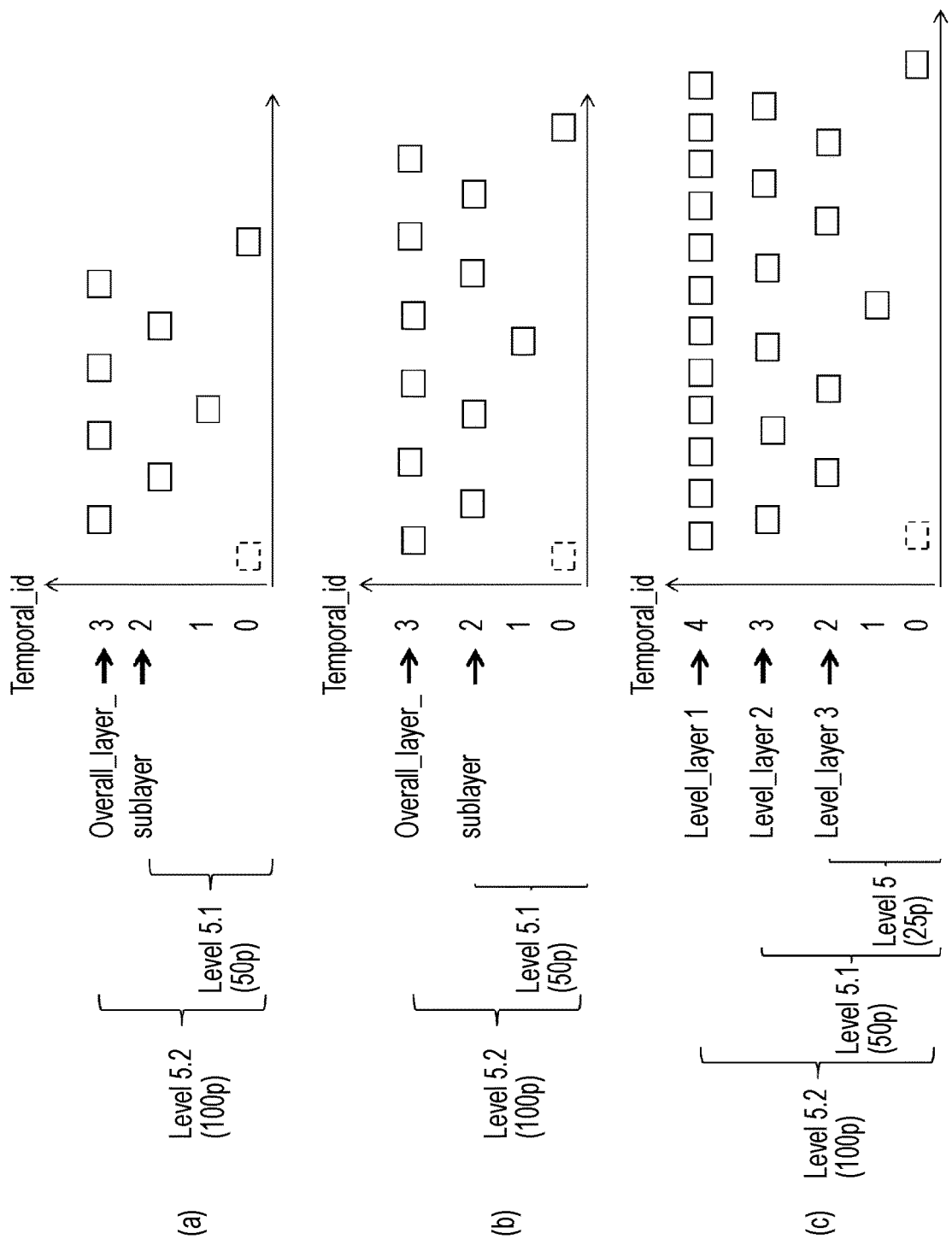
FIGS. 3(a) to 3(c) are diagrams illustrating an example of hierarchical encoding.

FIGS. 3(a) to 3(c) illustrate an example of hierarchical encoding, and each rectangular frame indicates a picture. FIG. 3(a) is an example in which the uppermost layer is 3. For example, a level designation value of a bit stream of a layer range whose maximum layer is layer 3 is "level5.2" corresponding to a service of 2160/100P, and the information on the layer range indicates 0 to 3. Furthermore, for example, a level designation value of a bit stream of a layer range whose maximum layer is layer 2 is "level5.1" corresponding to a service of 2160/50P, and the information on the layer range indicates 0 to 2.

FIG. 3(b) is an example in which the uppermost layer is 3. For example, a level designation value of a bit stream of a layer range whose maximum layer is layer 3 is "level5.2" corresponding to a service of 2160/100P, and the information on the layer range indicates 0 to 3. Furthermore, for example, a level designation value of a bit stream of a layer range whose maximum layer is layer 2 is "level5.1" corresponding to a service of 2160/50P, and the information on the layer range indicates 0 to 2.

FIG. 3(c) is an example in which the uppermost layer is 4. For example, a level designation value of a bit stream of a layer range whose maximum layer is layer 4 is "level5.2" corresponding to a service of 2160/100P, and the information on the layer range indicates 0 to 4. Furthermore, for example, a level designation value of a bit stream of a layer range whose maximum layer is layer 3 is "level5.1" corresponding to a service of 2160/50P, and the information on the layer range indicates 0 to 3. Furthermore, for example, a level designation value of a bit stream of a layer range whose maximum layer is layer 2 is "level5" corresponding to a service of 2160/25P, and the information on the layer range indicates 0 to 2.

Here, a value of "level_idc" is described. FIG. 4 illustrates "level_idc" and an example of the value. For example, "level_idc" corresponding to a service of 1080/50P is "level4.1", and the value is "123" in decimal and "0x7b" in hexadecimal. To indicate this "level4.1", "b", which is the lower 4 bits, is to be described as "1s4b_sublayer_level_idc" in an HEVC descriptor, which will be described later. Furthermore, for example, "level_idc" corresponding to a service of 1080/100P is "level4.2", and the value is "126" in decimal and "0x7e" in hexadecimal.

Furthermore, for example, "level_idc" corresponding to a service of 2160/50P is "level5.1", and the value is "153" in decimal and "0x99" in hexadecimal. To indicate this "level5.1", "9", which is the lower 4 bits, is to be described as "1s4b_sublayer_level_idc" in an HEVC descriptor, which will be described later. Furthermore, for example, "level_idc" corresponding to a service of 2160/100P is "level5.2", and the value is "156" in decimal and "0x9c" in hexadecimal.

Furthermore, for example, "level_idc" corresponding to a service of 4320/50P s "level6.1", and the value is "183" in decimal and "0xb7" in hexadecimal. To indicate this "level6.1", "7", which is the lower 4 bits, is to be described as "1s4b_sublayer_level_idc" in an HEVC descriptor, which will be described later. Furthermore, for example, "level_idc" corresponding to a service of 4320/100P is "level6.2", and the value is "186" in decimal and "0xba" in hexadecimal.

The reception apparatus 200 receives the above described transport stream TS transmitted from the transmission apparatus 100 on a broadcast wave or on an internet packet. The reception apparatus 200 extracts the encoded image data of the picture in the layer lower than the predetermined layer from the video data contained in the transport stream TS and decodes the encoded image data according to the own decoding capability. At this time, the reception apparatus 200 performs decoding on the basis of the level designation value of the bit stream and the information on the layer range in each of the layer ranges having a different maximum layer which are inserted in the transport stream TS as described above.

"Configuration of the Transmission Apparatus"

Figure 5:
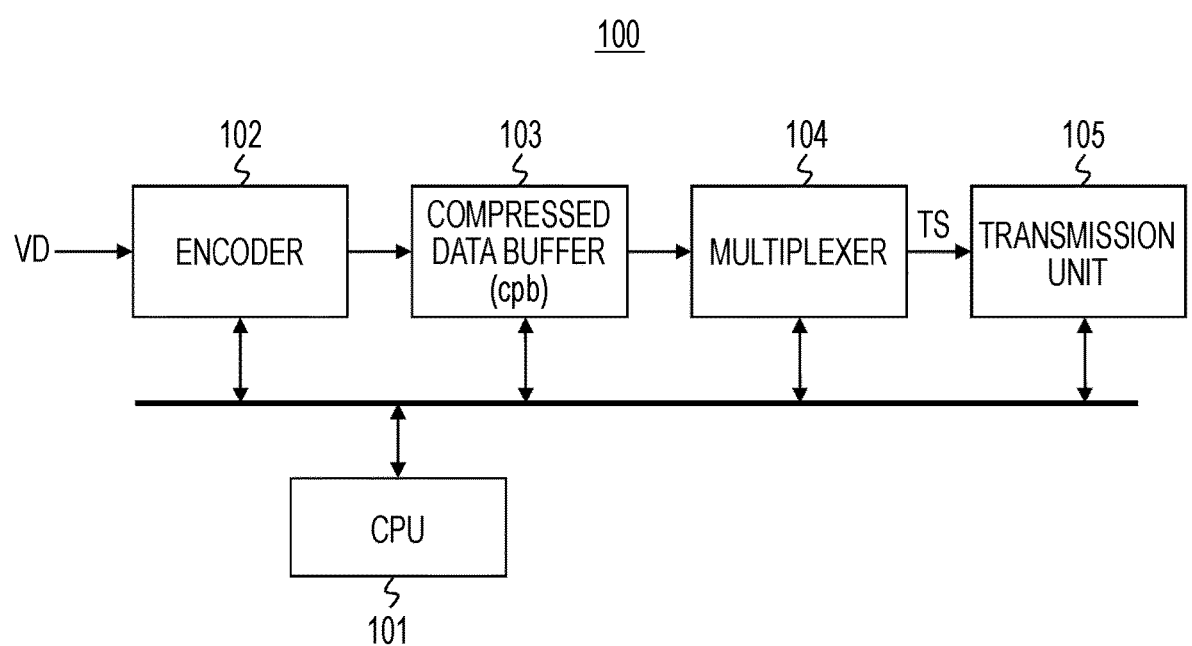
FIG. 5 is a block diagram illustrating a configuration example of a transmission apparatus.

FIG. 5 illustrates a configuration example of the transmission apparatus 100. The transmission apparatus 100 includes a central processing unit (CPU) 101, an encoder 102, a compressed data buffer (cpb: coded picture buffer) 103, a multiplexer 104, and a transmission unit 105. The CPU 101 is a control unit, and controls the operations of the units of the transmission apparatus 100.

The encoder 102 inputs decoded moving picture data VB and hierarchically encodes the data. The encoder 102 classifies image data of each picture consisting the moving picture data VB into a plurality of layers. Then, the encoder 102 encodes the classified image data of the picture in each of the layers, and generates a video stream (video data) having the encoded image data of the picture in each of the layers.

The encoder 102 performs encoding, such as H.264/AVC or H. 265/HEVC. At this time, the encoder 102 performs encoding so that a picture to be referred (a referred picture) belongs to the own layer and/or a layer lower than the own layer. The coded picture buffer (cpb) 103 temporarily stores the video stream containing the encoded image data of the picture in each of the layers and generated by the encoder 102.

The multiplexer 104 reads and PES-packetizes the video stream stored in the compressed data buffer 103, multiplexes the video stream by transport-packetizing the video stream, and obtains the transport stream TS as a multiplexed stream. The transport stream TS contains a single video stream as described above. The multiplexer 104 inserts, in a layer of a container, the level designation value of the bit stream and the information on the layer range in the layer ranges (level layers) having a different maximum layer. The transmission unit 105 transmits the transport stream TS obtained by the multiplexer 104 to the reception apparatus 200 on a broadcast wave or an internet packet.

[Insertion of Information]

The insertion of information by the multiplexer 104 is further described. To insert the information, an existing HEVC descriptor (HEVC_descriptor) or a newly defined layer/signaling/descriptor (Layer_signaling descriptor) is used.

FIG. 6 illustrates a structure example (Syntax) in the case of an existing HEVC descriptor to which elements are added. An 8-bit field of "descriptor_tag" indicates a descriptor type, and indicates an HEVC descriptor here. An 8-bit field of "descriptor_length" indicates the length (size) of the descriptor, and indicates the following number of bytes as the length of a descriptor.

An 8-bit field of "profile_idc" indicates a profile of a bit stream. An 8-bit field of "level_idc" indicates a level designation value of a bit stream in the uppermost layer. A 4-bit field of "1s4b_sublayer_level_idc" indicates a level designation value of a bit stream, in a layer lower than the uppermost layer (for example, the layer one level below the uppermost layer). In this case, lower 4 bits are arranged in hexadecimal.

Furthermore, in the case of "temporal_layer_subset_flag=1", there exists a 3-bit field of each of "temporal_id_min", "temporal_id_max", "temporal_id_sublayer_min", and "temporal_id_sublayer_max". "temporal__id_max" indicates a value of temporal_id of the uppermost layer of the layer range in which the maximum layer is the highest layer, that is, the uppermost layer, and "temporal_id_min" indicates a value of temporal_id of the lowest layer of the layer range. Furthermore "temporal_id_sublayer_max" indicates a value of temporal_id of the uppermost layer of the layer range in which the maximum layer is lower than the uppermost layer (normally, the layer one level below the uppermost layer), and "temporal_id_sublayer_min" indicates a value of temporal_id of the lowest layer of the layer range.

For example, a specific example of each field description in the hierarchical encoding example illustrated in FIG. 3(a) is described. "0x9c", which is the value of "level5.2", is described in the 8-bit field of "level_idc". "9" of 0x99", which is the value of "level5.1" is described in the 4-bit field of "1s4b_sublayer_level_idc".

"011" indicating temporal_id=3 is described in the 3-bit field of "temporal_id_max", and "000" indicating t temporal_id=0 is described in the 3-bit field "temporal_id_min". Furthermore, "010" indicating temporal_id=2 is described in the 3-bit field of "temporal_id_sublayer_max", and "000" indicating temporal_id=0 is described in the 3-bit field of "temporal_id_min".

FIG. 7 illustrates a structure example (Syntax) of a layer/signaling/descriptor (Layer_signaling descriptor). Furthermore, FIG. 8 illustrates semantics of main information in the structure example. By the above described HEVC descriptor (FIG. 6), a level designation value of a bit stream and information on a layer range in each of two layer ranges are transmitted. However, by the layer/signaling/descriptor, a level designation value of a bit stream and information on a layer range in each of three or more layer ranges can be transmitted.

The 8-bit field of "descriptor_tag" indicates a descriptor type, and indicates a layer/signaling/descriptor here. An 8-bit field of "descriptor_length" indicates the length (size) of the descriptor, and indicates the following number of bytes as the length of a descriptor.

An 8-bit field of "overall_profile_idc" indicates a profile of the maximum range related to scalable encode tools. An 8-bit field of "highest_level_idc" indicates the maximum level of a scalable range. An 8-bit field of "number_of_profile_layers" indicates the number of profile layers having a scalable function. "number_of_level_layers" indicates the number of level layers.

An 8-bit field of "layer_profile_idc[i]" indicates a profile of each profile layer. An 8-bit field of "layer_level_idc[i][j]" indicates a level of each level layer. An 8-bit field of "temporal_id_layer_min[i][j]" indicates a value of the minimum temporal_id in each level layer. An 8-bit field of "temporal_id_layer_max[i][j]" indicates a value of the maximum temporal_id in each level layer.

For example, a specific example of each field description related to a level in the hierarchical encoding example illustrated in FIG. 3(c) is described. "0x9c", which is the value of "level5.2", is described in the 8-bit field of "highest_level_idc". When three layer ranges in which each of layers 4, 3, and 2 is the maximum layer are set, "3" indicating that that the number of level layers is three is described in an 8-bit field of "number_of_level_layers".

Then, with regard to a first level layer, "0x9c", which is the value of "level5.2", is described in the 8-bit field of "layer_level_idc[i][j]", "100" indicating temporal_id=4 is described in the 8-bit field of "temporal_id_layer_max[i][j]", and "000" indicating temporal_id=0 is described in the 8-bit field of "temporal_id_layer_min [i][j]".

Furthermore, with regard to a second level layer, "0x99", which is the value of "level5.1", is described in the 8-bit field of "layer_level_idc [i][j]", "011" indicating temporal_id=3 is described in the 8-bit field of "temporal_id_layer_max[i][j]", and "000" indicating temporal_id=0 is described in the 8-bit field of "temporal_id_layer_min[i][j]".

Furthermore, with regard to a third level layer, "0x96", which is the value of "level5", is described in the 8-bit field of "layer_level_idc[i][j]", "010" indicating temporal_id=2 is described in the 8-bit field of "temporal_id_layer_max[i][j]", and "000" indicating temporal_id=0 is described in the 8-bit field of "temporal_id_layer_min[i][j]".

Here, a configuration example of a profile layer is described with reference to FIGS. 9(a) to 9(c). FIG. 9(a) is an example of encoding an 8-bit image whose image quality is improved with two streams by encoding difference data as an extended stream of a scalable main profile of "Profile_layering_id=1" in addition to a base stream of a main profile of "Profile_layering_id=0", compared with the base stream alone.

FIG. 9(b) is an example of encoding a 10-bit image whose image quality is improved with two streams by encoding difference data as an extended stream of a scalable main10 profile of "Profile_layering_id=1" in addition to a base stream, of a main10 profile of "Profile_layering_id=0", compared with the base stream alone.

FIG. 9(c) is an example of encoding an 8-bit image whose image quality is improved with two streams by encoding difference data as an extended stream 1 of a scalable main profile of "Profile_layering_id=1" in addition to a base stream of a main profile of "Profile_layering_id=0", compared with the base stream alone. Furthermore, an image having an accuracy of 10 bits obtained by encoding difference data between 10 bits and 8 bits as an extended stream 2 of a scalable main profile of "Profile_layering_id=2" is encoded.

Note that, the added value of displaying by the scalable extended stream not only improves the above described image quality, but also applies to scalable extension related to increase of a spatial resolution, expansion of a color gamut, and an expansion of a luminance level. With regard to these streams, by analyzing a packet from a decoder input buffer of a receiver and appropriately discriminating the packet, it is possible to perform desired decoding.

[Configuration of the Transport Stream TS]

Figure 10:
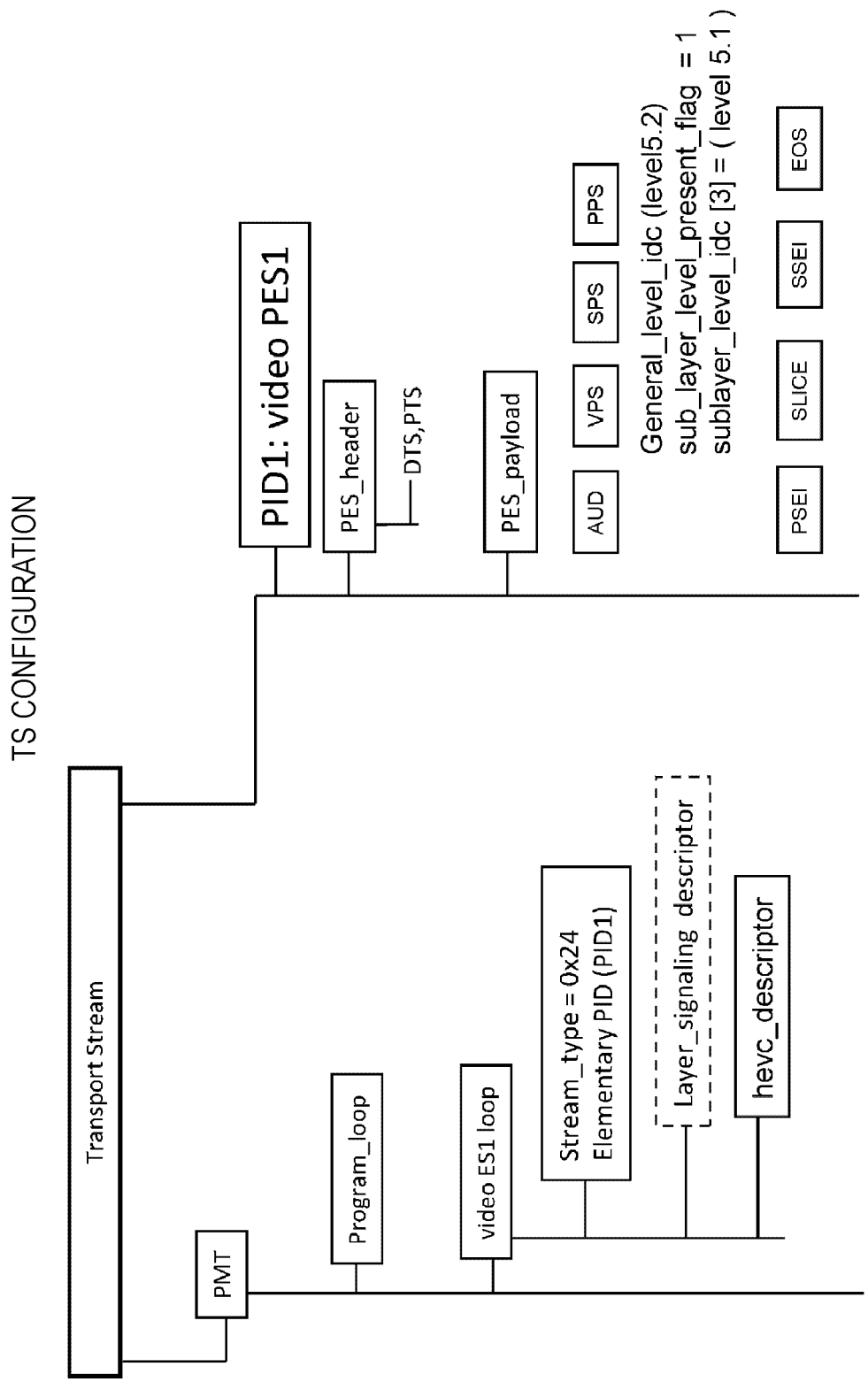
FIG. 10 is a diagram illustrating a configuration example of a transport stream TS.

FIG. 10 illustrates a configuration example of the transport stream TS. The transport stream TS contains one video stream. In other words, in this configuration example, there exists a PES packet "video PES1" of a video stream having encoded image data of pictures of a plurality of layers by, for example, an HEVC.

In the encoded image data of each picture, there exists an NAL unit, such as a VPS, SPS, PPS, SLICE, or SEI. As described above, the layer identification information on the picture ("nuh_temporal_id_plus1"indicating temporal_id) is arranged in the header of the NAL unit. "general_level_idc", which is a level designation value of a bit stream, is inserted in SPS Furthermore, the transport stream TS contains a program map table (PMT) as program specific information (PSI). The PSI is the information in which it is described that elementary streams contained in the transport stream each belong to which program.

In the PMT, there exists a program/loop (Program loop) describing information related to an entire program. Furthermore, there exists an elementary/loop having information related to each elementary stream in the PMT. In the configuration example, there exists a video elementary/loop (video ES1 loop).

In the video elementary/loop, information, such as a stream type and a packet identifier (PID), corresponding to a video stream (video PES1), and a descriptor describing information related to the video stream is arranged. As one of the descriptors, the above described HEVC descriptor (HEVC_descriptor) or layer/signaling/descriptor (Layer_signaling descriptor) is inserted. Note that, the layer/signaling/descriptor is not inserted, when the element-added HEVC descriptor illustrated in FIG. 6 is used.

The operations of the transmission apparatus 100 illustrated in FIG. 5 are briefly described. The decoded moving picture data VD is input to the encoder 102. The encoder 102 performs hierarchical encoding to the moving picture data VD. In other words, the encoder 102 classifies the image data of each picture consisting the moving picture data VD into a plurality of layers, encodes the image data, and generates a video stream (video data) having the encoded image data of the picture in each of the layers. In this case, the image data Is encoded so that a picture to be referred belongs to the own layer and/or a layer lower than the own layer.

The video stream containing the encoded data of the picture in each of the layers and generated by the encoder 102 is supplied to the compressed data buffer (cpb) 103 and temporarily stored. By the multiplexer 104, the video stream stored in the compressed data buffer 103 is read. PES-packetized, and multiplexed by being transport-packetized, and the transport stream TS as a multiplexed stream is obtained. The transport stream TS contains a single video stream.

When the transport stream TS is generated by the multiplexer 104 in this manner, the level designation value of the bit stream and the information on the layer range in the layer ranges having a different maximum layer are inserted in the layer of the container. For example, the element-added HEVC descriptor (see FIG. 6) or the layer/signaling/descriptor (see FIG. 7) is inserted under the program map table (PMT). The transport stream TS generated by the multiplexer 104 is transmitted to the transmission unit 105. The transport stream TS is transmitted to the reception apparatus 200 on a broadcast wave or an internet packet by the transmission unit 105.

"Configuration of the Reception Apparatus"

Figure 11:
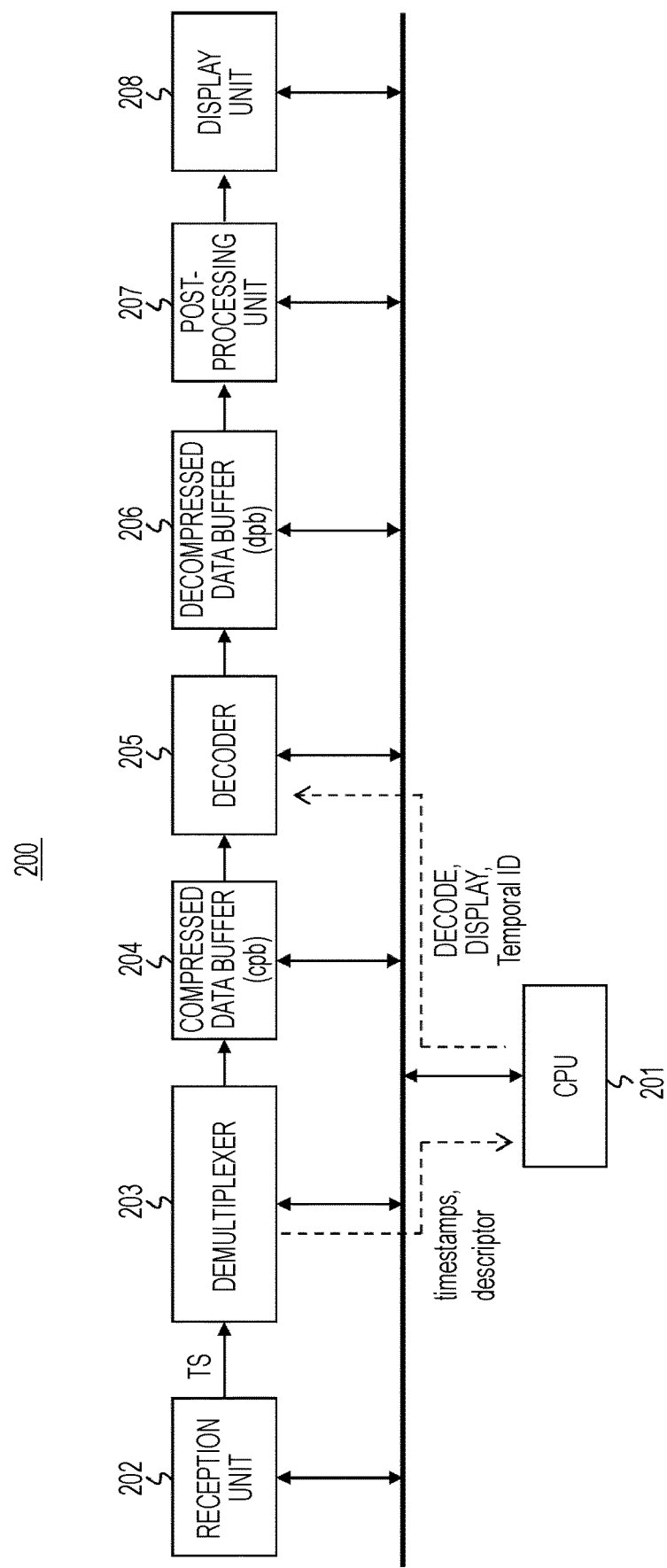
FIG. 11 is a block diagram illustrating a configuration example of a reception apparatus.

FIG. 11 illustrates a configuration example of the reception apparatus 200. The reception apparatus 200 includes a central processing unit. (CPU) 201, a reception unit 202, a demultiplexer 203, and a compressed data buffer (cpb: coded picture buffer) 204. Furthermore, the reception apparatus 200 includes a decoder 205, a decompressed data, buffer (dpb: decoded picture buffer) 206, a post-processing unit 207, and a display unit 208. The CPU 201 consists a control unit, and controls the operations of the units of the reception apparatus 200.

The reception unit 202 receives the transport stream TS transmitted from the transmission apparatus 100 on a broadcast wave or on an internet packet. The demultiplexer 203 extracts, from the transport stream TS, a TS packet, consisting the video stream contained in the transport stream TS after filtering the TS packet with a PID filter, and transmits the transport stream TS to the compressed data buffer (cpb: coded picture buffer) 204.

Furthermore, the demultiplexer 203 extracts section data data from the transport stream TS, and transmits the section data data to the CPU 201. The section data contains the above described HEVC descriptor (HEVC_descriptor) and layer/signaling/descriptor (Layer_signaling descriptor), The CPU 201 determines the layer range which the decoder 205 can decode from the layer ranges indicated by these descriptors with the level designation value of the bit stream and the information on the layer range, and transmits the information on the temporal ID (temporal_id) of the layer range to the decoder 205.

Furthermore, the demultiplexer 203 extracts a program clock, reference (PGR) from the TS packet containing the PGR, and transmits the PGR to the CPU 201. Furthermore, the demultiplexer 203 extracts time stamps (DTS and PTS) inserted in a PES header for each picture, and transmits the time stamps to the CPU 201.

The compressed data buffer (cpb) 204 temporarily stores the encoded image data of each picture according to the TS packet transferred from the demultiplexer 203. The decoder 205 reads and decodes the encoded image data of each picture stored in the compressed data buffer 204 at a decode timing supplied by a decoding time stamp (DTS) of the picture, and transmits the decoded image data to the decompressed data buffer (dpb: decoded picture buffer) 206. At this time, the decoder 205 selectively decodes only the encoded image data of the picture contained in the decodable layer range on the basis of the information on the temporal ID (temporal_id) of the decodable layer range supplied by the CPU 201.

Figure 12:
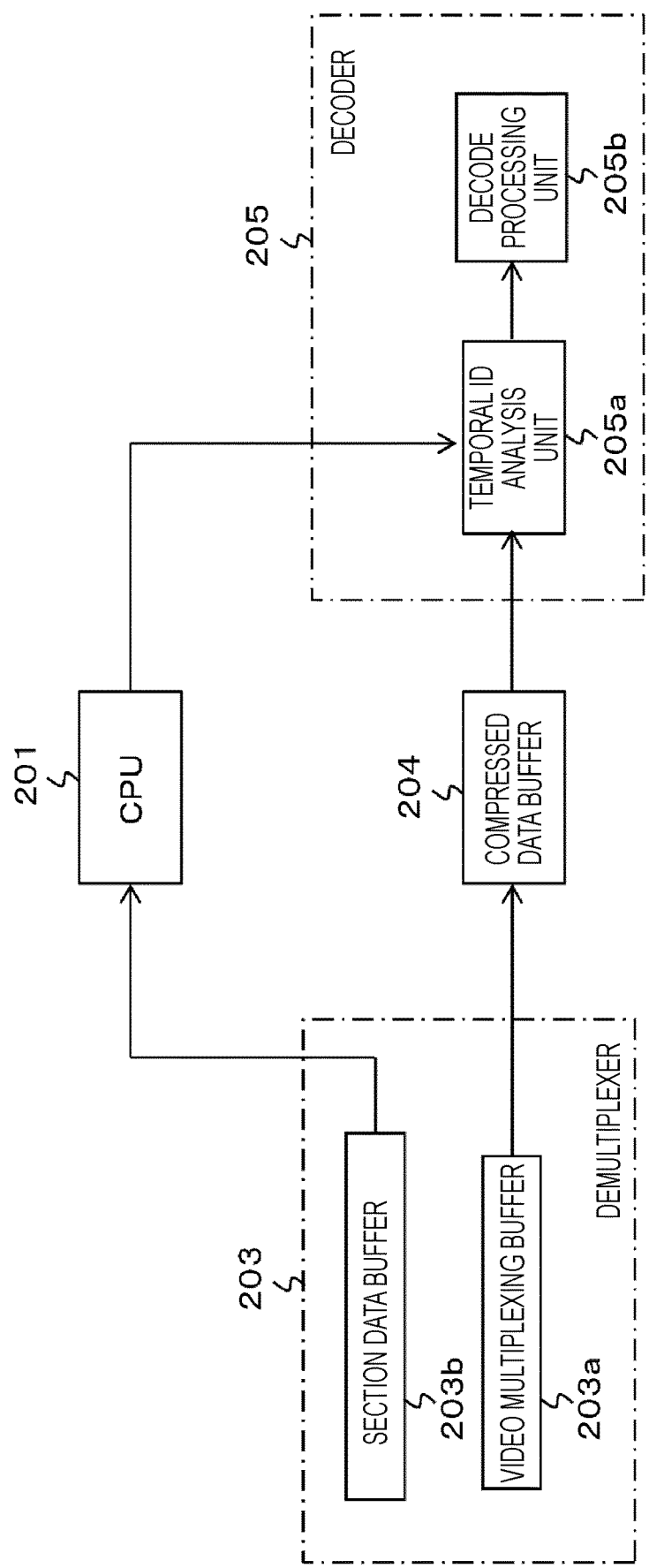
FIG. 12 is a diagram schematically illustrating a configuration of a demultiplexer and a decoder.

FIG. 12 schematically illustrates a configuration example of the demultiplexer 203 and the decoder 205. The demultiplexer 203 includes a video multiplexing buffer 203a and a section data buffer 203b. The TS packet corresponding to a program number equivalent to a broadcasting service channel and extracted from the transport stream TS with the PID filter is temporarily stored in the video multiplexing buffer 203a, and then, is transferred to the compressed data buffer 204. Furthermore, the section data extracted from the transport stream TS with the PID filter is temporarily stored in the section data buffer 203b, and then, is transmitted to the CPU 201.

Furthermore, the decoder 205 includes a temporal ID analysis unit 205a and a decode processing unit 205b. The temporal ID analysis unit 205a sequentially reads the encoded data, of each picture stored in the compressed data buffer 204 at the decode timing, and analyzes the information, on the temporal ID (temporal_id) inserted in the NAL unit header. Then, the temporal ID analysis unit 205a transfers the encoded data to the decode processing unit 205b when determining the encoded data is within the decodable layer range, and discards the encoded data without transferring the encoded data to the decode processing unit 205b when determining the encoded data is not within the decodable layer range. Note that, the information on the temporal ID (temporal_id) of the decodable layer range is supplied to the temporal ID analysis unit 205a by the CPU 201.

For example, the case of the hierarchical encoding example of FIG. 3(a) is described. For example, when the decoder 205 is a 100p decoder, "0 to 3" is supplied to the temporal ID analysis unit 205a as the information on the temporal ID of the decodable layer ranges by the CPU 201. Thus, the temporal ID analysis unit 205a transmits the encoded image data of the pictures in the layers 0 to 3 to the decode processing unit 205b.

Figure 13:
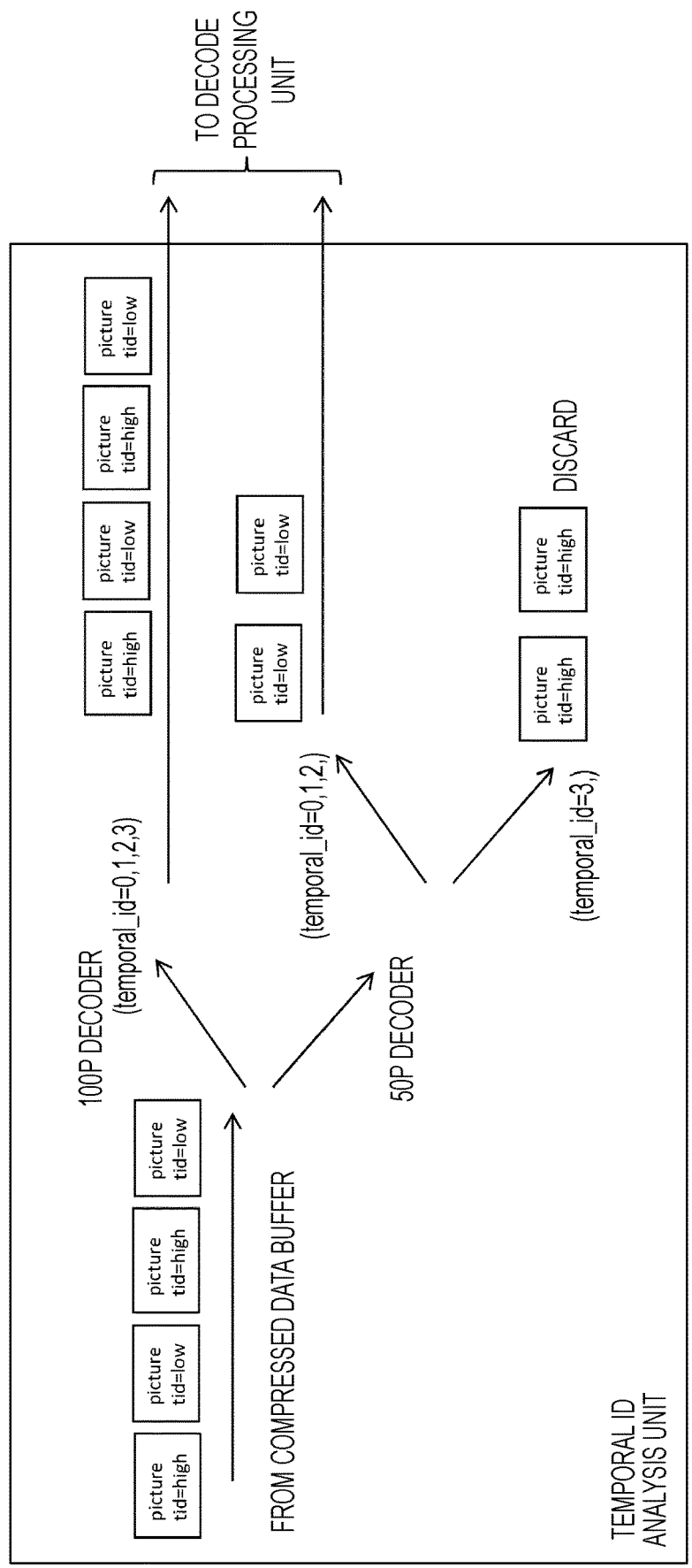
FIG. 13 is a diagram schematically illustrating behavior of a temporal ID analysis unit.

On the other hand, when the decoder 205 is a 50p decoder, "0 to 2" is supplied to the temporal ID analysis unit 205a as the information on the temporal ID of the decodable layer ranges by the CPU 201. Thus, the temporal ID analysis unit 205a transmits the encoded image data of the pictures in the layers 0 to 2 to the decode processing unit 205b. On the other hand, the temporal ID analysis unit 205a discards the encoded image data of the picture in the layer 3 without transmitting the encoded image to the decode processing unit 205b. FIG. 13 schematically illustrates such behavior of the temporal ID analysis unit 205a. Note that, "tid=high" indicates the layer 3, and "tid=low" indicates the layers 0 to 2.

Returning back to FIG. 11, the decompressed data buffer (dpb) 206 temporarily stores the image data of each picture decoded by the decoder 205. The post-processing unit 207 performs, to the image data of each picture sequentially read at the display timing supplied by the presentation time stamp (PTS) from the decompressed data buffer (dpb) 206, processing to adjust the frame rate to the display capability.

For example, when the frame rate of the image data of each picture after decoding is 50 fps and the display capability is 100 fps, the post-processing unit 207 performs interpolation processing to the image data of each picture after decoding so that the time direction resolution becomes twice, and transmits the image data of 100 fps to the display unit 208.

The display unit 208 is constituted by, for example, a liquid crystal display (LCD), an organic electro-luminescence (EL) panel, or the like. Note that, the display unit 208 may be an external device connected to the reception apparatus 200.

Figure 14:
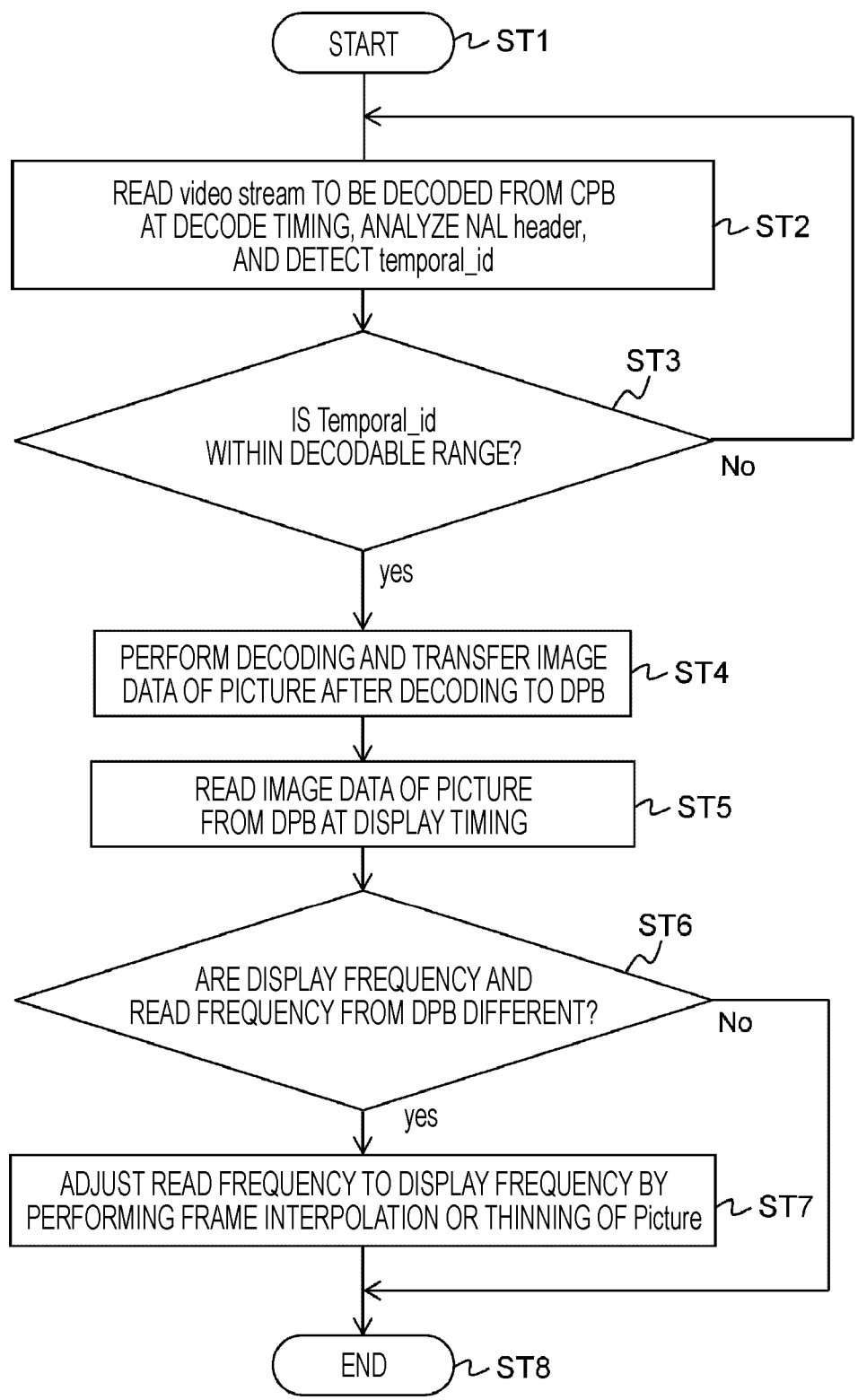
FIG. 14 is an example of a processing flow of a decoder and a post-processing unit.

FIG. 14 illustrates an example of a processing flow of the decoder 205 and the post-processing unit 207, In step ST1, the processing is started, and then moves to the processing in step ST2. In step ST2, the decoder 205 reads, from the compressed data buffer (cpb) 204, the video stream to be decoded at the decode timing (the encoded image data of the picture to be decoded), and detects the temporal ID (temporal_id).

Next, in step ST3, the decoder 205 determines whether the temporal ID (temporal_id) detected in step ST2 is within the decodable range. When the temporal ID is not within the decodable range, the decoder 205 does not perform the decode processing, and returns back to the processing in step ST2. On the other hand, when the temporal ID is within the decodable range, the decoder 205 moves to the processing in step ST4. In step ST4, the decoder 205 performs the decode processing, and transfers the image data of the picture after decoding to the decompressed data buffer (dpb) 206.

Next, in step ST5, the post-processing unit 207 reads, from the decompressed data buffer (dpb) 206, the image data of the image data of the picture to be displayed at the display timing. Next, in step ST6, the post-processing unit 207 determines whether a display frequency and a read frequency from the decompressed data buffer (dpb) 206 are different. When the frequencies are different, in step ST7, the post-processing unit 207 adjusts the read frequency to the display frequency by performing frame interpolation or thinning of the picture. After the processing in step ST7, the processing is terminated in step ST8. Furthermore, when the frequencies are not different in step ST6, the processing is immediately terminated in step ST8.

The operations of the reception, apparatus 200 illustrated in FIG. 11 are briefly described. The transport stream TS transmitted from the transmission apparatus 100 on a broadcast wave or on an internet packet is received by the reception unit 202. The transport stream TS is transmitted to the demultiplexer 203. The TS packet, corresponding to a service is extracted, from the transport stream TS, on the basis of the PID information contained in the PMT by the demultiplexer 203. The TS packet is transmitted to the compressed data buffer (cpb) 204, and temporarily stored.

Furthermore, the section data is extracted from the transport stream TS, and transmitted to the CPU 201 by the demultiplexer 203. The layer range which the decoder 205 can decode is determined from the layer ranges described by the HEVC descriptor or the layer/signaling/descriptor with the level designation value of the bit stream and the information on the layer range, and the information on the temporal ID (temporal_id) of the layer range is transmitted to the decoder 205 by the CPU 201.

The encoded image data of each picture stored in the compressed data buffer 204 is decoded at the decode timing of the picture, transmitted to the decompressed data buffer (dpb) 206, and temporarily stored by the decoder 205. In this case, by the decoder 205, the encoded image data of the picture within the decodable layer range is only selectively decoded on the basis of the information on the temporal ID (temporal_id) of the decodable layer range supplied by the CPU 201.

The image data of each picture stored in the decompressed data buffer (dpb) 206 is sequentially read at the display timing, and transmitted to the post-processing unit 207. Interpolation, subsample, or thinning is performed to the image data of each picture to adjust the frame rate to the display capability by the post-processing unit 207. The image data of each picture processed by the post-processing unit 207 is supplied to the display unit 208, and the moving picture is displayed with the image data of each picture.

As described above, in the transceiver system 10 illustrated in FIG. 1, the element-added HEVC descriptor (see FIG. 6) or the layer/signaling/descriptor (see FIG. 7) is inserted in the layer of the container of the transport stream TS by the transmission apparatus 100. These descriptors have the level designation value of the bit stream and the information on the layer range in each of the layer ranges having a different maximum layer. Thus, for example, it is possible for the receiving side to decode the encoded image data of the picture in the layer range according to the decoding performance on the basis of the information.

2. Modified Example

[Application to the MPEG-DASH-Based Stream Distribution System]

Note that, in the above described embodiment, the example in which the container is a transport stream (MPEG-2 TS) has been described. However, the present technology can be similarly applied to a system having a configuration in which a stream is distributed to a reception terminal using a network, such as the internet. In an internet distribution, a stream is mainly distributed by a container of an MP4 or other formats.

FIG. 15(a) illustrates a configuration example of an MPEG-DASH-based stream distribution system 30. The stream distribution system 30 has a configuration in which a DASH stream file server 31 and a DASH MPD server 32 are connected to N number of receivers 33-1, 33-2, . . . , and 33-N through a content delivery network (CDM) 34.

The DASH stream file server 31 generates, on the basis of media data (video data, audio data, subtitle data, or the like) of predetermined content, a stream segment conforming to DASH (hereinafter, appropriately referred to as a "DASH segment"), and transmits the segment in response to an HTTP request from the receiver. The DASH stream file server 31 may be a streaming-dedicated server, or used as a web server.

Furthermore, the DASH stream file server 31 transmits, in response to a request of a segment of a predetermined stream transmitted from the receiver 33 (33-1, 33-2, . . . and 33-N) through the CDN 34, the segment of the stream to the receiver, which is the request source, through the CDN 34. In this case, the receiver 33 performs the request by referring to the value of the rate described in a media presentation description (MPD) file and selecting a stream of an optimal rate according to a network environment where a client is placed.

The DASH MPD server 32 is a server to generate an MPD file to acquire the DASH segment, generated by the DASH stream file server 31. The MPD file is generated based on content metadata from a content management server (not illustrated) and an address (url) of the segment generated by the DASH stream file server 31.

In an MPD format, using an element of representation for each stream of a video and audio, each attribute is described. For example, by separating the representation for each of a plurality of video data streams having a different rate, each rate is described in the MPD file. The receiver 33 can select an optimal stream according to the conditions of the network environment where the receiver 33 is placed by referring to the value of the rate as described above.

Figure 15:
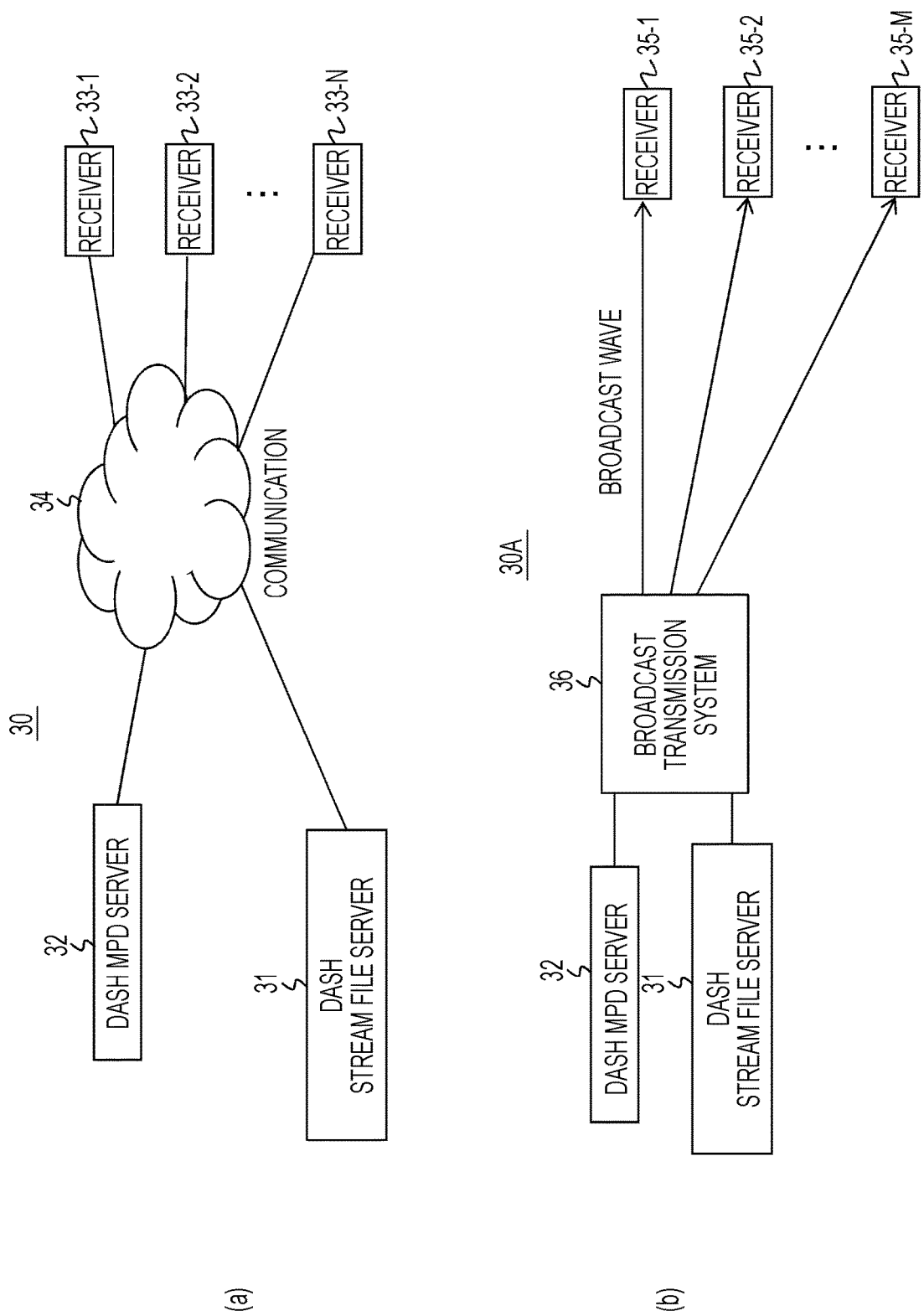
FIGS. 15(a) and 15(b) are diagrams illustrating a configuration example of an MPEG-DASH-based stream distribution system.

FIG. 15(*b*) also illustrates a configuration example of an MPEG-DASH-based stream distribution system 30A. The stream distribution system 30A is constituted by a broadcast transmission system 36 with which the DASH stream file server 31 and the DASH MPD server 32 are connected, and M number of receivers 35-1, 35-2, . . . , and 35-M. In the case of the stream distribution system 30A, the broadcast transmission system. 36 transmits a stream segment conforming to DASH (DASH segment) generated by the DASH stream file server 31 and the MPD file generated by the DASH MPD server 32 on a broadcast wave.

Figure 16:
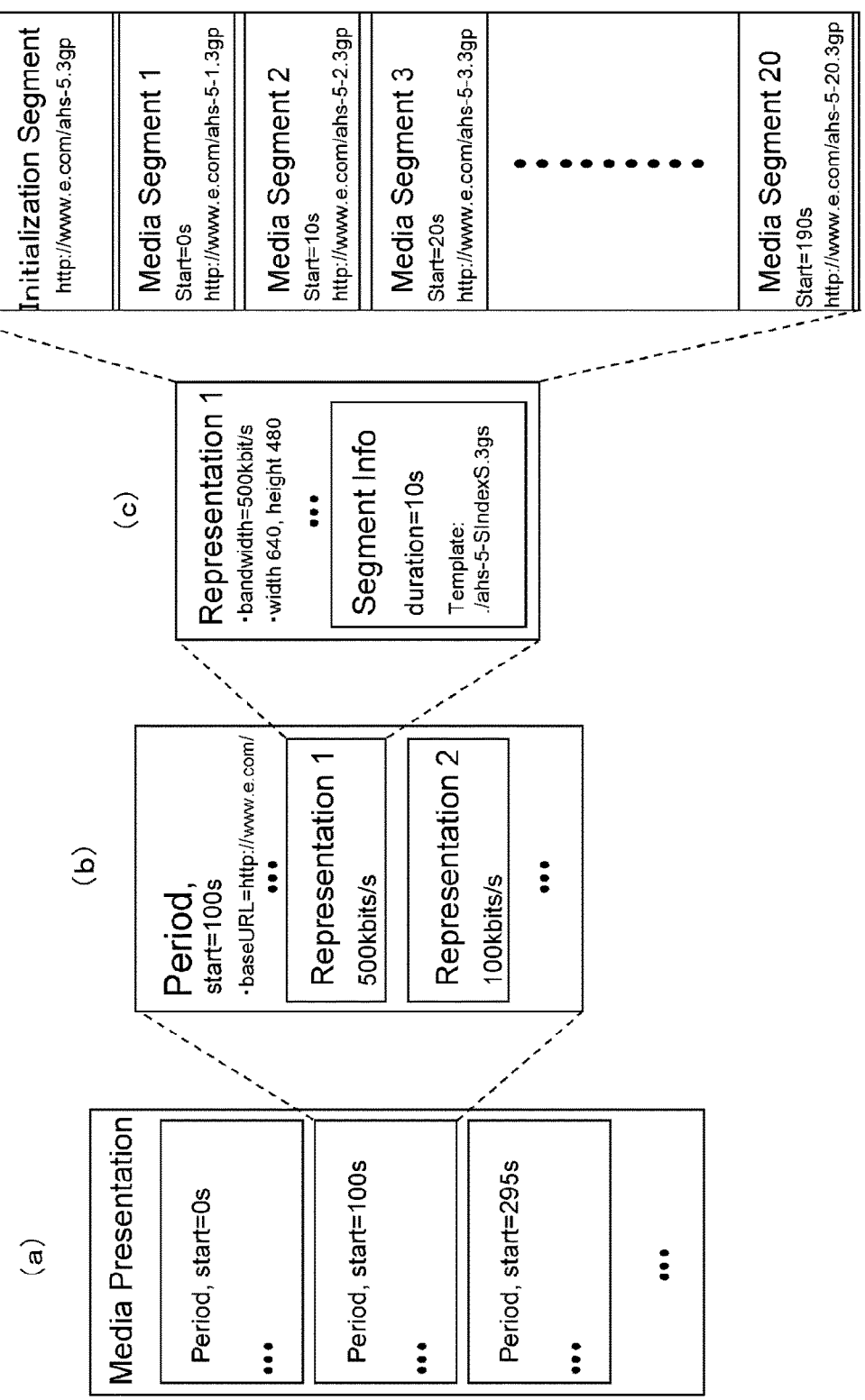
FIGS. 16(a) to 16(d) are diagrams illustrating an example of a relation between structures hierarchically arranged in an MPD file.

FIGS. 16(*a*) to 16(*d*) illustrate an example of a relation between structures hierarchically arranged in the above described MPD file. As illustrated in FIG. 16(*a*), a plurality of periods divided by time intervals exists in a media presentation as a whole MPD file. For example, a first period starts from 0 second, the next period starts from 100 seconds, and so on.

As illustrated in FIG. 16(*b*), a plurality of representations exists in the periods. A stream attribute grouped by AdaptationSet, such as a representation group associated with a video data stream having different rate and the same contents exists in the representations.

As illustrated in FIG. 16(*c*), the representation contains SegmentInfo. As illustrated in FIG. 16(*d*), there exist an initialization segment and a plurality of media segments, in which information on a segment into which the period is further divided is described, in the SegmentInfo.

There exist information and the like on an address (url) to actually acquire segment data, such as a video or audio, in the media segment.

Note that, switching stream can be freely performed between the representations grouped by AdaptationSet. Thus, according to the conditions of a network environment where an IPTV client is placed, it is possible to select a stream of an optimal rate, and perform seamless moving picture distribution.

Figure 17:
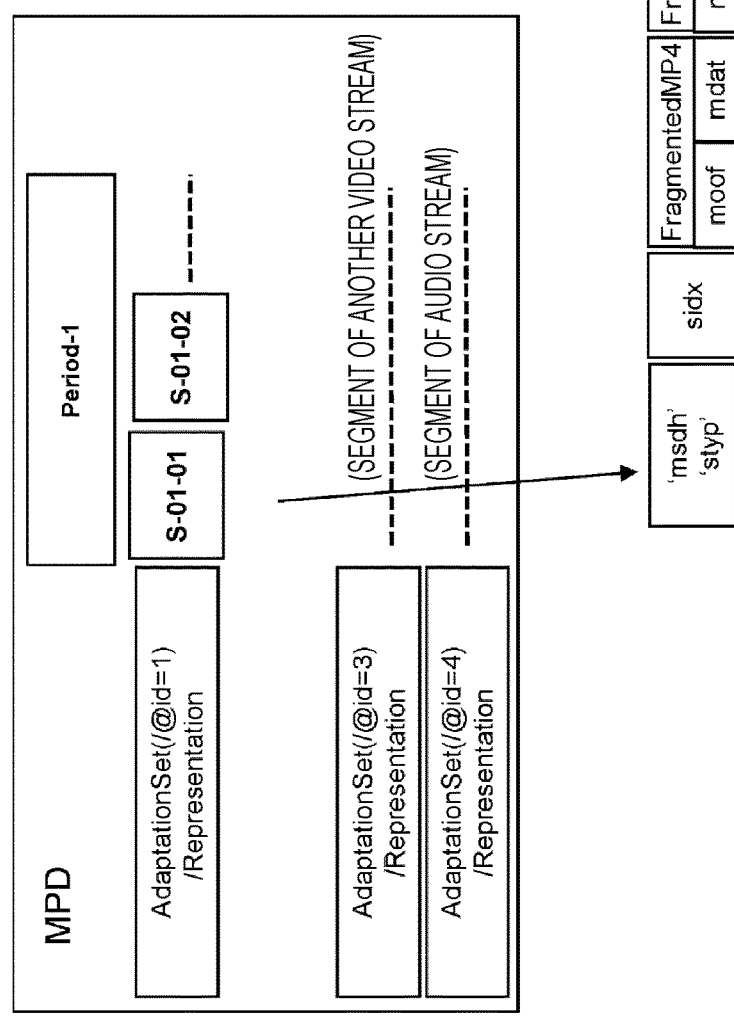
FIG. 17 is a diagram illustrating a configuration example of a FragmentedMP4 stream in association with an MPD file.

FIG. 17 illustrates a configuration example of a FragmentedMP4 stream in association with an MPD file. The FragmentedMP4 stream contains FragmentedMP4 obtained by packetizing a video stream. Encoded video data of predetermined pictures of the video stream, for example, 1 GOP is inserted in the part of "mdat" of FragmentedMP4.

The present technology can be applied to the stream distribution systems 30 and 30A illustrated in FIGS. 15(*a*) and (*b*). In this case, the video stream has been hierarchically encoded similarly to the above described embodiment. Furthermore, the contents equivalent to the description contents of, for example, the above described layer/signaling/descriptor (see FIG. 7) are inserted in the MPD file, and transmitted to the receiving side. FIG. 18 illustrates an implementation of an MPD file.

Furthermore, the transceiver system 10 constituted by the transmission apparatus 100 and the reception apparatus 200 has been described in the above described embodiment, however, the transceiver system to which the present technology can be applied is not limited to this. For example, the part of the reception apparatus 200 may be, for example, a set top box and monitor connected by a digital interface, such as High-Definition Multimedia Interface (HDMI). Note that, "HDMI" is a registered trademark.

Furthermore, the present technology can be following configurations:

(1) A transmission apparatus includes an image encoding unit which classifies image data, of each picture consisting moving picture data into a plurality of layers, encodes the classified image data of the picture in each of the plurality of layers, and generates video data having the encoded image data of the picture in each of the plurality of layers, a data transmission unit which transmits the video data, and an information transmission unit which transmits a level designation value of a bit stream and information on a layer range in each of a plurality of layer ranges having a different maximum layer.

(2) The transmission apparatus according to the (1), in which the information transmission unit inserts the information in a layer of a container containing the video data and transmits the information.

(3) The transmission apparatus according to the (2), in which the container is an MPEG2-TS, and the information transmission unit inserts the information under a program map; table and transmits the information.

(4) The transmission apparatus according to the (1), in which the information transmission unit inserts the information in a metafile having meta-information related to the video data, and transmits the information, (5) The transmission apparatus according to the (4), in which the metafile is an MPD file.

(6) The transmission apparatus according to any one of the (1) to (5), in which the information transmission unit transmits, together with information on a profile, the level designation value of the bit stream and the information on the layer range in each of the plurality of layer ranges having a different maximum layer.

(7) A transmission method includes an image encoding step for classifying image data of each picture consisting moving picture data into a plurality of layers, encoding the classified image data of the picture in each of the plurality of layers, and generating video data having the encoded image data of the picture in each of the plurality of layers, a data transmitting step for transmitting the video data, and an information transmitting step for transmitting a level designation value of a bit stream and information on a layer range in each of a plurality of layer ranges having a different, maximum layer.

(8) A reception apparatus includes a data reception unit which receives video data, having encoded image data of a picture in each of a plurality of layers obtained by classifying image data, of each picture consisting moving picture data into the plurality of layers and encoding the image data, an information reception unit which receives a level designation value of a bit stream and information on a layer range in each of a plurality of layer ranges having a different maximum layer, and a processing unit which extracts, from the video data, the encoded image data of the picture in a layer lower than a predetermined layer and decodes the encoded image data on the basis of the information.

(9) The reception apparatus according to the (8), in which the information reception unit acquires the information from a layer of a container containing the video data.

(10) The reception apparatus according to the (8),
in which the information reception unit acquires the information from a metafile having meta-information related to the video data.

(11) A reception method includes a data receiving step for receiving video data having encoded image data of a picture in each of a plurality of layers obtained by classifying image data of each picture consisting moving picture data into the plurality of layers and encoding the image data, an information receiving step for receiving a level designation value of a bit stream and information on a layer-range in each of a plurality of layer ranges having a different maximum layer, and a processing step for extracting, from the video data, the encoded image data of the picture in a layer lower than a predetermined layer and decoding the encoded image data, on the basis of the information.

The main feature of the present technology is by transmitting a level designation value of a bit stream and information on a layer range in each of a plurality of layer ranges having a different maximum layer when video data, hierarchically encoded is transmitted, it is possible for a receiving side to easily decode the encoded image data of the picture of the layer range according to decoding performance (see FIG. 10, FIG. 6, and FIG. 7).

REFERENCE SIGNS LIST

10 Transceiver system
30, 30A MPEG-DASH-based stream distribution system
31 DASH stream file server
32 DASH MPD server
33-1, 33-2, . . . , 33-N, 35-1, 35-2, . . . , 35-M receiver
34 Content delivery network (CDN)
36 Broadcast transmission system
100 Transmission apparatus
101 CPU
102 Encoder
103 Compressed data buffer (cpb)
104 Multiplexer
105 Transmission unit
200 Reception apparatus
201 CPU
202 Reception unit
203 Demultiplexer
203a Video multiplexing buffer
203b Section data buffer
204 Compressed data buffer (cpb)
205 Decoder
205a Temporal ID analysis unit
205b Decode processing unit
206 Decompressed data buffer (dpb)
207 Post-processing unit
208 Display unit

The invention claimed is:

1. A transmission apparatus, comprising:
circuitry configured to
classify image data of each picture including moving picture data into a plurality of layers, encode the classified image data of the picture in each of the plurality of layers, and generate video data having the encoded image data of the picture in each of the plurality of layers;
transmit the video data;
transmit layer identification information in a header of each picture, the layer identification information identifying each of the plurality of layers; and
transmit information that specifies a plurality of level designation values, each of the plurality of level designation values having a corresponding one of a plurality of layer ranges of a bit stream, each of the plurality of layer ranges including a common one of the plurality of layers, wherein
the layer identification information is different from the information that specifies the plurality of level designation values.

2. The transmission apparatus according to claim 1, wherein the circuitry is configured to
insert the information in a layer of a container containing the video data and transmit the information.

3. The transmission apparatus according to claim 2, wherein the container is an MPEG2-TS, and
the circuitry is configured to insert the information under a program map table and transmit the information.

4. The transmission apparatus according to claim 1, wherein the circuitry is configured to insert the information in a metafile having meta-information related to the video data, and transmit the information.

5. The transmission apparatus according to claim 4, wherein the metafile is a media presentation description (MPD) file.

6. The transmission apparatus according to claim 1, wherein the circuitry is configured to transmit, together with a profile, the information.

7. The transmission apparatus according to claim 1, wherein the circuitry is configured to insert the layer identification information into the header of a network abstraction layer (NAL) unit of each picture.

8. The transmission apparatus according to claim 1, wherein the circuitry is configured to insert the information into a sequence parameter set (SPS) unit of each picture.

9. The transmission apparatus according to claim 1, wherein the information that specifies the plurality of level designation values includes, for each of the plurality of layer ranges, a maximum layer value that indicates an identifier of an uppermost layer of the respective layer range and a minimum layer value that indicates a lowest layer of the respective layer range.

10. The transmission apparatus according to claim 1, wherein each of the plurality of layer ranges includes each layer below a maximum one of the plurality of layers included in the respective layer range.

11. A transmission method, comprising:
classifying, using circuitry, image data of each picture including moving picture data into a plurality of layers, encoding the classified image data of the picture in each of the plurality of layers, and generating video data having the encoded image data of the picture in each of the plurality of layers;
transmitting the video data, using the circuitry;
transmitting layer identification information in a header of each picture, the layer identification information identifying each of the plurality of layers; and
transmitting, using the circuitry, information that specifies a plurality of level designation values, each of the plurality of level designation values having a corresponding one of a plurality of layer ranges of a bit stream, each of the plurality of layer ranges including a common one of the plurality of layers, wherein
the layer identification information is different from the information that specifies the plurality of level designation values.

12. A reception apparatus, comprising:

circuitry configured to receive video data having encoded image data of pictures in each of a plurality of layers obtained by classifying image data of each picture including moving picture data into the plurality of layers and encoding the image data;

receive layer identification information included in a header of each picture, the layer identification information identifying each of the plurality of layers;

receive information that specifies a plurality of level designation values, each of the plurality of level designation values having a corresponding one of a plurality of layer ranges of a bit stream, each of the plurality of layer ranges including a common one of the plurality of layers; and extract, from the video data, encoded image data of pictures in a layer lower than a predetermined layer and decode the extracted encoded image data on the basis of the information and the layer identification information, wherein the layer identification information is different from the information that specifies the plurality of level designation values.

13. The reception apparatus according to claim 12, wherein the circuitry is configured to acquire the information from a layer of a container containing the video data.

14. The reception apparatus according to claim 12, wherein the circuitry is configured to acquire the information from a metafile having meta-information related to the video data.

15. A reception method, comprising:

receiving, using circuitry, video data having encoded image data of pictures in each of a plurality of layers obtained by classifying image data of each picture including moving picture data into the plurality of layers and encoding the image data;

receiving layer identification information in a header of each picture, the layer identification information identifying each of the plurality of layers;

receiving, using the circuitry, information that specifies a plurality of level designation values, each of the plurality of level designation values having a corresponding one of a plurality of layer ranges of a bit stream, each of the plurality of layer ranges including a common one of the plurality of layers; and extracting, using the circuitry, from the video data, encoded image data of pictures in a layer lower than a predetermined layer and decoding the extracted encoded image data on the basis of the information and the layer identification information, wherein the layer identification information is different from the information that specifies the plurality of level designation values.

* * * * *